United States Patent
Price et al.

(10) Patent No.: US 7,777,173 B2
(45) Date of Patent: Aug. 17, 2010

(54) OBJECT DETECTION SYSTEM WITH A VCSEL DIODE ARRAY

(75) Inventors: Vernon D. Price, Springfield, TN (US); Jun Jiang, Goodlettsville, TN (US)

(73) Assignee: Autosense L.L.C., Golden, CO (US)

( * ) Notice: Subject to any disclaimer, the term of this patent is extended or adjusted under 35 U.S.C. 154(b) by 0 days.

(21) Appl. No.: 11/735,315

(22) Filed: Apr. 13, 2007

(65) Prior Publication Data

US 2007/0241933 A1     Oct. 18, 2007

Related U.S. Application Data

(63) Continuation-in-part of application No. PCT/US2005/037189, filed on Oct. 14, 2005.

(51) Int. Cl.
*G06M 7/00* (2006.01)
*G08G 1/16* (2006.01)

(52) U.S. Cl. .................. 250/221; 340/903

(58) Field of Classification Search .............. 250/221, 250/222.1; 340/903
See application file for complete search history.

(56) References Cited

U.S. PATENT DOCUMENTS

| | | | |
|---|---|---|---|
| 5,707,139 A * | 1/1998 | Haitz | 362/231 |
| 5,812,571 A * | 9/1998 | Peters | 372/36 |
| 6,201,236 B1 * | 3/2001 | Juds | 250/221 |
| 6,586,721 B2 | 7/2003 | Estevez-Garcia | |
| 6,633,367 B2 | 10/2003 | Gogolla | |
| 6,736,321 B2 | 5/2004 | Tsikos et al. | |
| 6,842,152 B2 | 1/2005 | Kikuchi | |
| 7,129,508 B2 | 10/2006 | Chen | |
| 2004/0042737 A1 | 3/2004 | Devine et al. | |
| 2004/0202218 A1 | 10/2004 | Thornton | |
| 2004/0232430 A1 * | 11/2004 | Lempkowski et al. | 257/80 |
| 2004/0256630 A1 | 12/2004 | Cao | |

* cited by examiner

*Primary Examiner*—Thanh X Luu
(74) *Attorney, Agent, or Firm*—Gary P. Topolosky; David A. Greenlee

(57) ABSTRACT

A vehicle-mounted object detection system utilizing vertical cavity surface emitting laser diodes as an emitter source to alert a motor vehicle operator to the presence of another moving vehicle in a monitored zone. The object detection system includes an optical transmitter and an optical receiver.

11 Claims, 14 Drawing Sheets

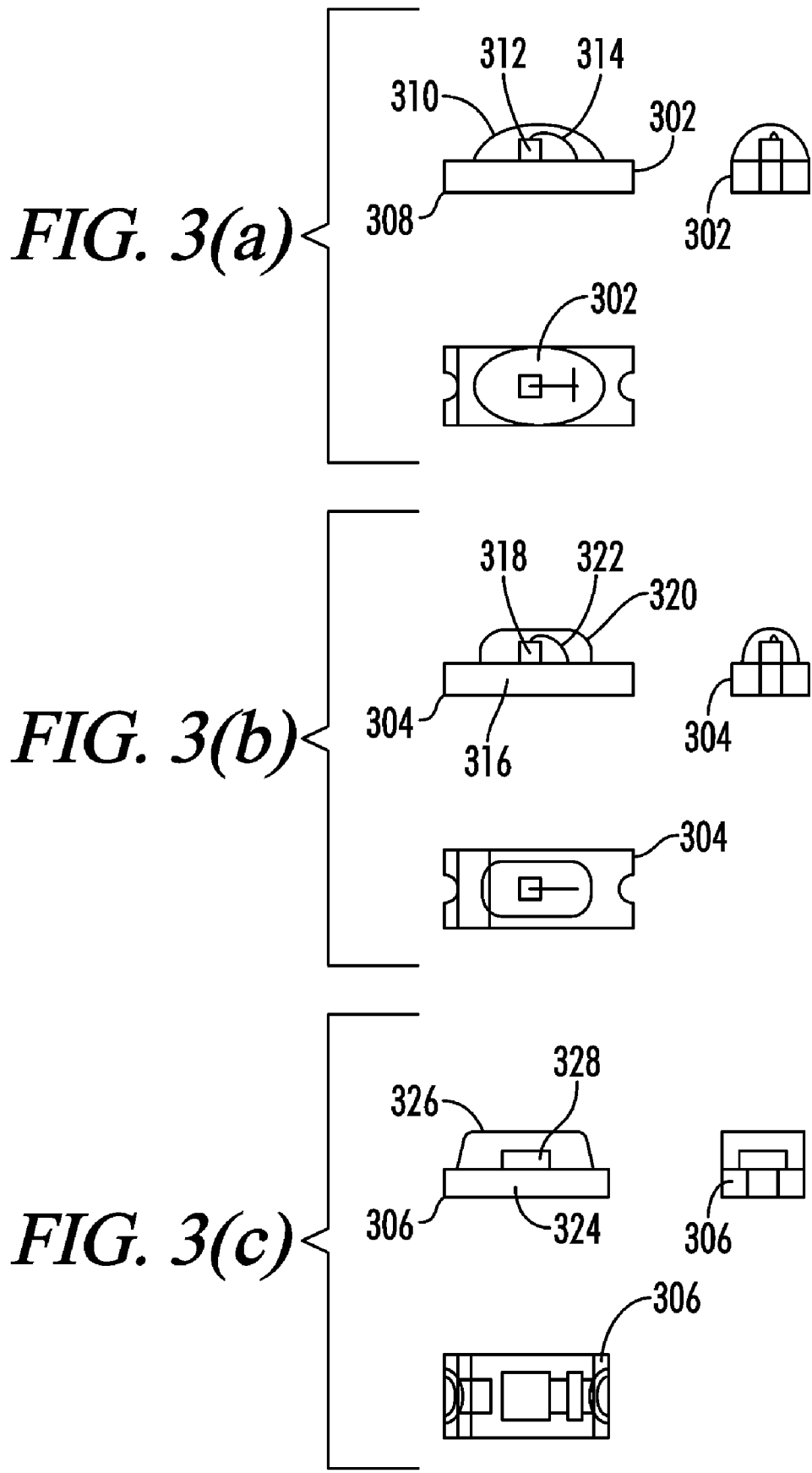

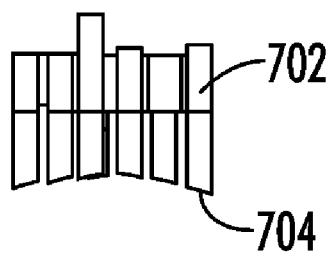
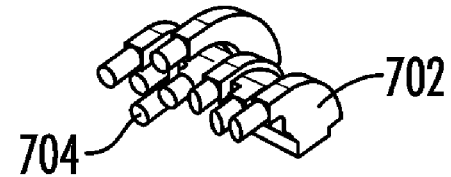
FIG. 7(a)  FIG. 7(b)
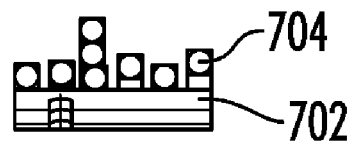
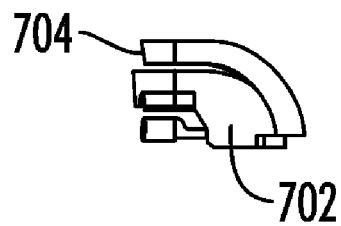
FIG. 7(c)  FIG. 7(d)
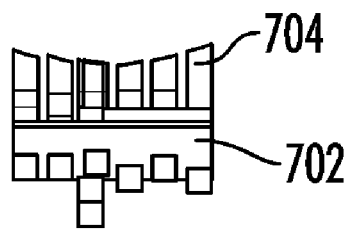
FIG. 7(e)

OBJECT DETECTION SYSTEM WITH A VCSEL DIODE ARRAY

CROSS-REFERENCES TO RELATED APPLICATIONS

This application is a continuation-in-part application which claims benefit of co-pending International Application No. PCT/US2005/037189 filed Oct. 14, 2005, entitled "OBJECT DETECTION SYSTEM WITH A VCSEL DIODE ARRAY" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Object detection systems have been developed to alert motor vehicle operators to the presence of another moving vehicle in a monitored zone that extends behind the side mounted vehicle mirror. The monitored zone of interest is commonly referred to as the "blind spot." Conventional side object detection (SOD) systems use an optical transmitter to transmit detection beams through a transmitter lens into the monitored zone, a receiver to receive detection beams that pass through a receiver lens after being reflected from an object in the monitored zone, and a system board that contains electronic hardware and software for generally controlling the system, including processing the received signals. The system board is electrically coupled to a vehicle electrical bus.

In many SOD systems, multiple detection or sensing beams are transmitted into the monitored detection zone from a light source that uses multiple edge emitting laser diodes. One or more photo-detectors are aimed into the monitored zone so that they will receive any reflection of the detection beams from an object in the monitored zone. Such systems typically use triangulation or phase shifts in the received reflections to discriminate between light reflected from objects within the monitored zone and light emanating from beyond the boundaries of the monitored zone. Examples of such systems are disclosed in U.S. Pat. Nos. 5,463,384 and 6,377,167, the contents of which are incorporated by reference.

Laser-type infrared light sources are preferred for many SOD systems, particularly edge emitting laser diodes. However, these edge emitting laser diodes produce a diffuse, elliptical beam, the reflections of which are very difficult to detect and analyze. Thus, it is difficult to accurately define object detection zones and, thereby, reduce false detections in SOD systems that use edge emitting laser diodes. Furthermore, edge emitting laser diodes themselves are relatively expensive and have relatively slow response times. Because of the orientation of the emitted beam, edge emitter laser diodes cannot be mounted in standard surface mount packages, further adding to the cost of their use in SOD systems. The high cost and low performance of edge emitting laser diodes results in a higher overall cost and diminished functionality for these prior art SOD systems which has greatly limited their SOD systems market penetration.

What is needed, then, is a vehicle mounted object detection system with a laser light source that is less expensive, provides increased accuracy, and that can be manufactured using conventional methods of assembly of surface mounted electronic components.

BRIEF SUMMARY OF THE INVENTION

The present invention is generally related to object detection systems. More particularly, the present invention is directed toward vehicle-mounted object detection systems utilizing vertical cavity surface emitting laser (VCSEL) diodes as an emitter source.

One embodiment of the object detection system includes an optical transmitter, an optical receiver, and a system board electrically coupled to the optical transmitter and receiver. The system board includes logic functional to cause the transmitter to generate optical signals, to cause the receiver to receive the optical signals when reflected from a detected object, and to process the received optical signals. The optical transmitter preferably includes an emitter module having at least one vertical cavity surface emitting laser (VCSEL) diode. The transmitter further includes a transmitter circuit board and the emitter module has at least one VCSEL chip mounted on the transmitter circuit board. Each VCSEL chip is formed of a plurality of VCSEL diodes mounted on a substrate in a surface mount package, the surface mount package having an integral heat dissipating element.

In another embodiment, the emitter module has a plurality of VCSEL chips mounted on the transmitter circuit board. The plurality of VCSEL chips are positioned on the transmitter circuit board in a pre-defined two dimensional VCSEL chip array;

BRIEF DESCRIPTION OF THE SEVERAL VIEWS OF THE DRAWINGS

FIG. 3(a)-(c) each contain side, edge, and top views of three different embodiments of VCSEL chips packaged in surface mount packages in accordance with the present invention.

FIGS. 7(a)-7(e) are, respectively, top, oblique, front, side, and bottom views of one embodiment of a fiber optic interface for the emitter and receiver boards of the present invention.

DETAILED DESCRIPTION OF THE INVENTION

The present invention is directed toward an object detection system for a motor vehicle. The embodiment described herein is for side object detection (SOD).

Figure 1:
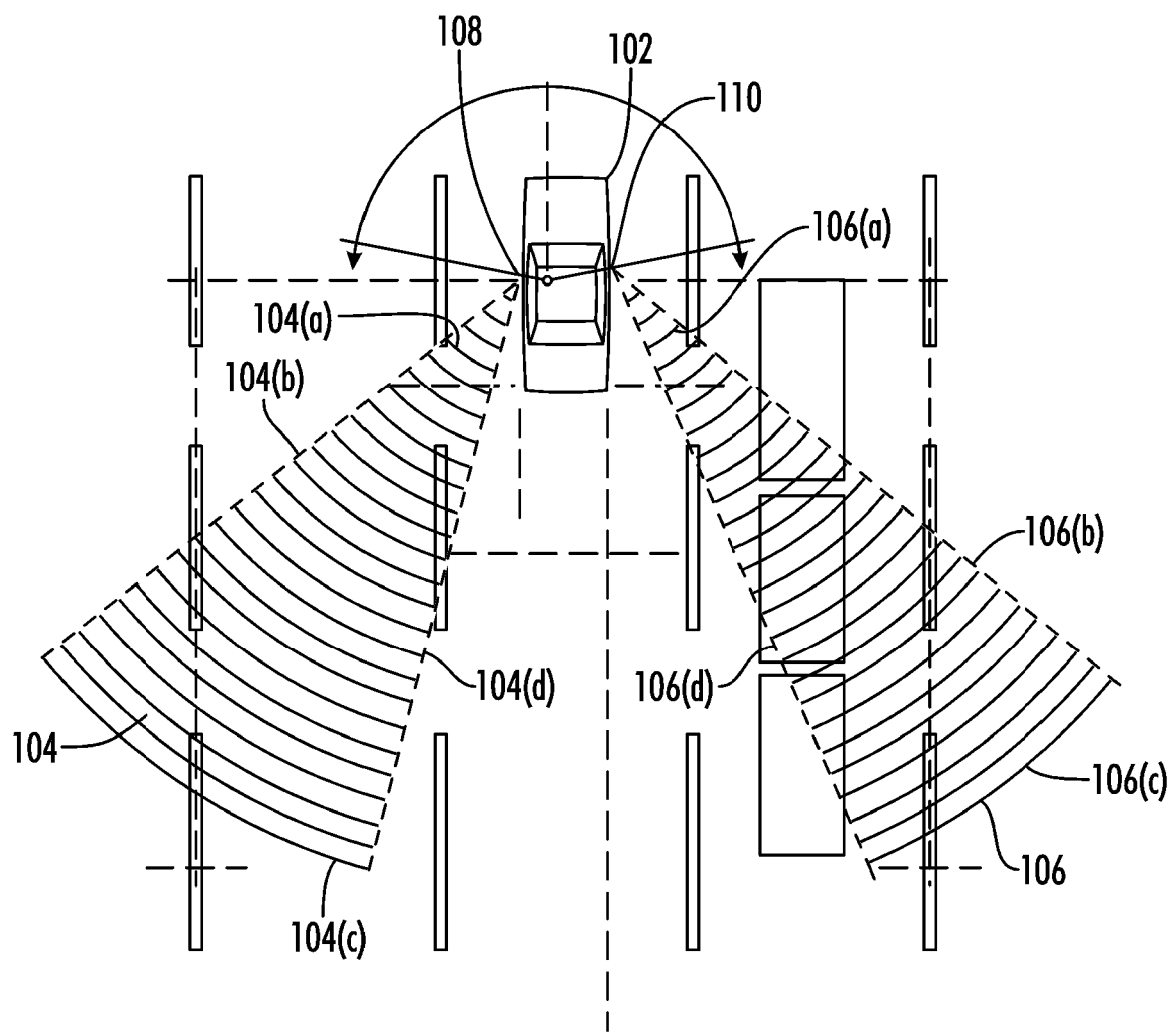
FIG. 1 is a top view of a vehicle positioned on a multi-lane highway, further illustrating zones extending from the vehicle side view mirrors monitored by an SOD system in accordance with the present invention.

The basic concept of SOD is illustrated in FIG. 1. The SOD system functions to provide information to the driver of a host vehicle 102 regarding the presence of one or more vehicles in adjacent detection zones 104 and 106 (sometimes referred to as monitored zones) that are monitored by SOD systems or units 108 and 110. The detection zones 104 and 106 are defined by boundaries 104(a-d) and 106(a-d). Preferably, the monitored zones 104 and 106 encompass the so-called "blind spots" or areas which the driver of a vehicle 102 cannot see directly or through the inside and outside rearview mirrors. In such a blind spot application of the present SOD system, a monitored zone 104 and 106 of approximately 4 to 25 ft is desired in order to adequately cover the driver-side and passenger-side blind spots as measured from the side rearview mirrors.

The emitter and detector units of the SOD systems 108 and 110 are preferably mounted in, or on, the vehicle's outside rearview mirrors. To detect an object in the monitored zones 104 and 106, a three-dimensional array of multiple optical beams (sometimes referred to as detection beams) are transmitted from the SOD systems 108 and 110 into the zones 104 and 106. As discussed in more detail below, the detection beams are preferably generated by an array of multiple vertical cavity surface emitting laser (VCSEL) diodes arranged in an array of multiple VCSEL chips. The reflected detection beams are received with a receiver in the SOD systems 108 and 110. Return signals corresponding to reflected detection beams are mixed with a phase controlled reference signal of the same frequency that is set to be 90 degrees out of phase with the returned signal that emanates from within a monitored zone boundary range. This produces a zero output from the mixer at the zone boundary because the signals are in phase quadrature in such a situation. Thus, a returned signal from an object within the monitored zone (closer than the range boundary) will produce a positively signed signal from the mixer, while a negatively signed signal is produced if the detected beam is from an object outside the monitored zone (beyond the range boundary). Although, the magnitude of phase shift in the returned signal can be used to determine the distance to the detected object, such a calculation is not necessary for purposes of SOD in the vehicle blind spot. Because the speed of light is substantially constant, the returned light signal will be phase shifted by 1.97 ns for every foot of range to the detected object. Therefore, the size of the detection zone can be altered simply by looking for particular magnitudes of phase shifts in the reflected signals.

Also, different frequencies can be selected for transmission such that the output of the mixer will selectively be positive or negative when an object is detected within one of the zones 104 and 106. Thus, by selecting certain varying frequencies for transmission, the need to determine a precise range to an object can be eliminated such that an object in the zone is detected simply by detecting the presence or absence of a positive output from the mixer. Such a detection method and system is disclosed in U.S. Pat. No. 6,377,167.

The vertical cavity surface emitting laser (VCSEL) diode is a relatively new type of laser diode. A VCSEL diode (sometimes simply referred to as a "VCSEL") produces a forwardly directed beam of substantially coherent light. In other words, as compared to an edge emitting laser diode, the beam from a VCSEL diode is directed from the top surface of the diode, away from the diode mounting surface. Typically, a single VCSEL diode is mounted on a substrate. Conventionally, a single VSCEL is a very low power device that is operated in a continuous mode or with a high duty cycle to produce visible illumination. The usable power output of a VCSEL is a function of the ability of the VCSEL package (and any associated heat sinking) to dissipate heat and its vulnerability to damage due to overheating. Thus, most VCSEL diodes in conventional application are packaged in metal cans for enhanced heat dissipation. In general, a VCSEL in conventional packaging is not suited for use in an SOD system. Relative to an edge emitting laser diode, a VCSEL is a lower power device with a faster response time.

Surface mount packages for electronic components are preferred in many applications due to their low profile, low cost, and suitability for use in highly automated manufacturing processes. The present inventors have discovered that by pulsing a VCSEL diode with a low duty cycle, and by fabricating arrays of multiple VCSEL diodes on a single substrate, a relatively high intensity infrared laser beam can be produced with a VCSEL diode array in a surface mount package without exceeding the heat dissipation capabilities of the package. More importantly, the present inventors have discovered that such a surface mounted VCSEL array can be used to create a high intensity, low duty cycle laser beam that is particularly well adapted for a vehicle object detection system such as discussed above with respect to FIG. 1.

Figure 2:
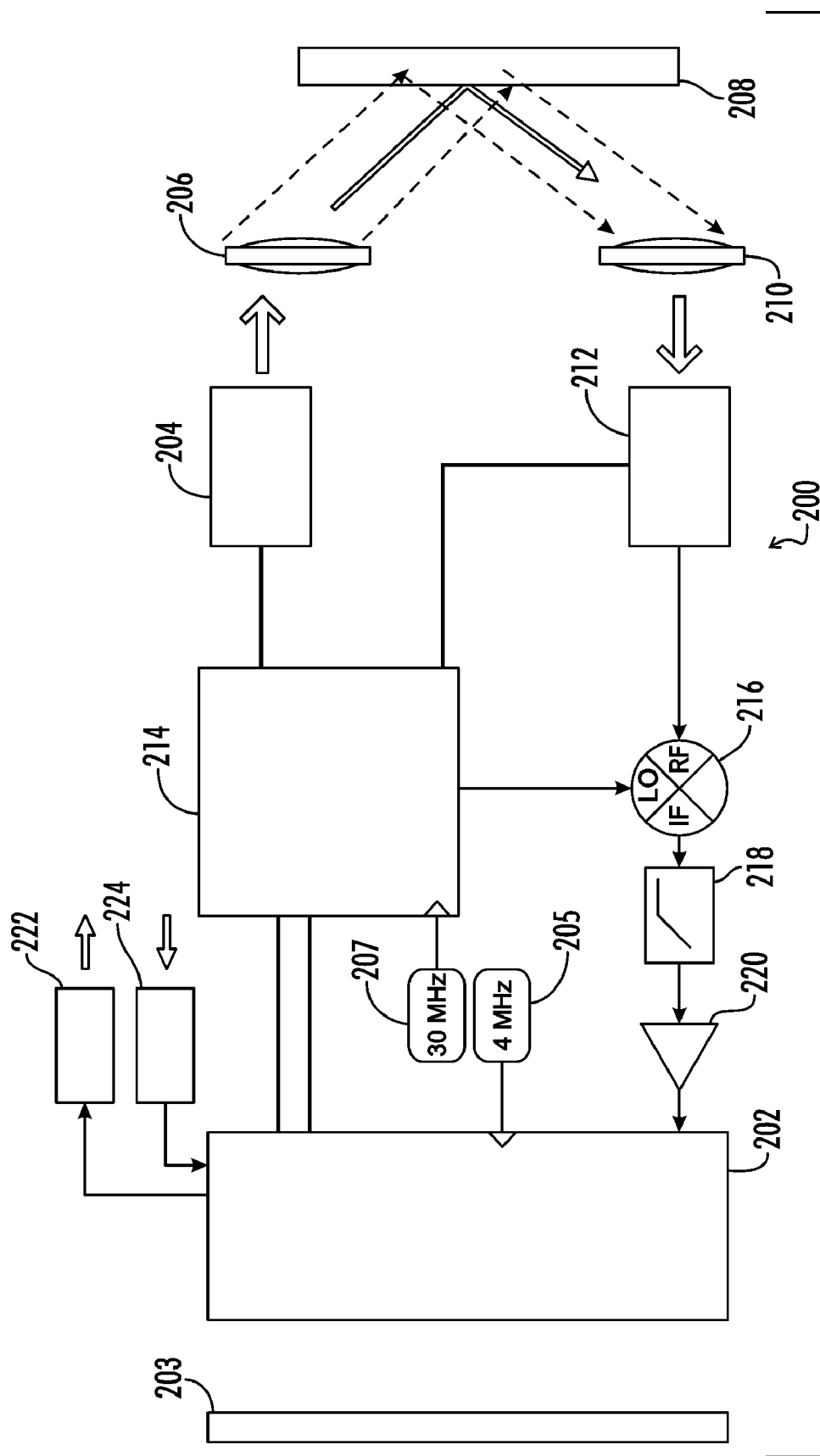
FIG. 2 is a system block diagram of a preferred embodiment of an SOD system in accordance with the present invention.
Figure 4A:
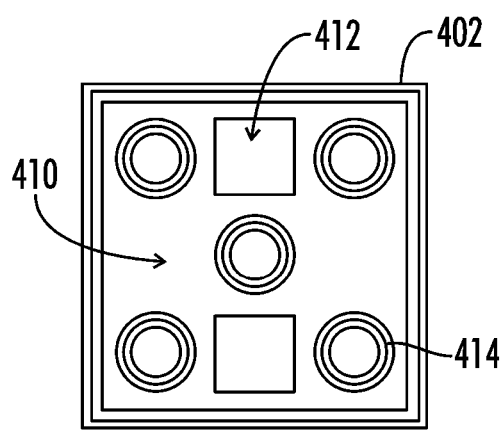
FIGS. 4(a)-(e) are top views of different embodiments of VCSEL diode arrays in accordance with the present invention.
Figure 4B:
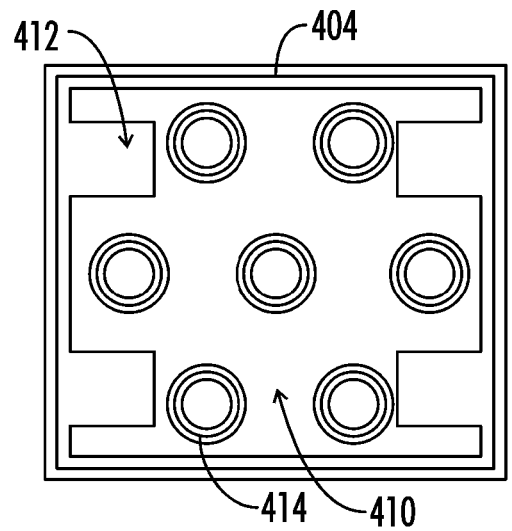
Figure 4C:
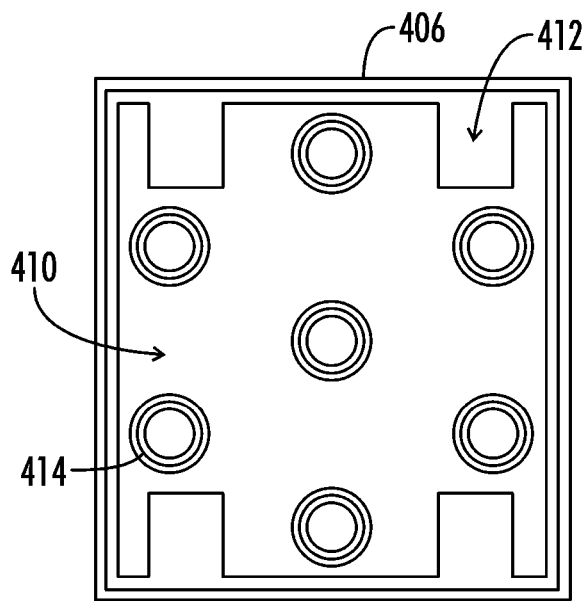
Figure 4D:
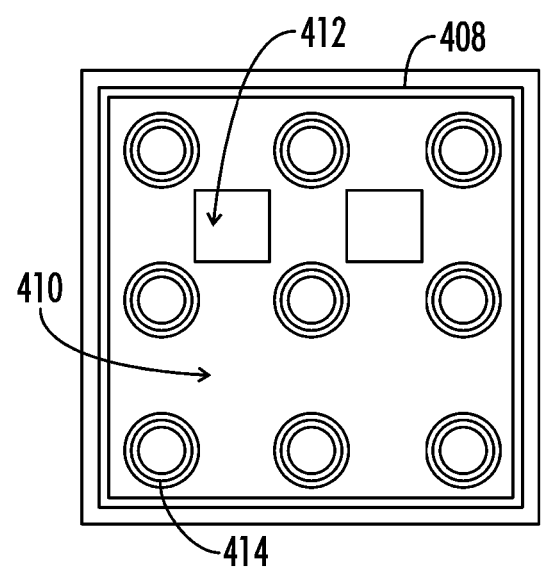
Figure 4E:
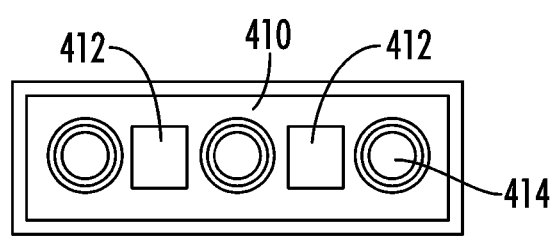

Referring now to FIG. 2, a diagram of one embodiment of an object detection system for a vehicle is shown. The system 200 is managed by a microcontroller 202 that communicates with the vehicle through a vehicle interface 203. The microcontroller 202 is driven by a clock 205. A transmitter module 204 having a set of emitters and associated drivers is used to produce infrared optical detection beams that are focused through a lens 206 toward an area in which it is desired to detect a reflecting object 208. As discussed in more detail herein, the transmitter 204 preferably include an array of VCSEL chips, with each VCSEL incorporating an array of VCSEL diodes. The detection beams reflected from the object 208 pass through a receiving lens 210 which directs the reflected beams to a receiver module 212 having a set of photodetectors and associated amplifiers. The circuitry to control the emitter module 204 and to process the signals from the receiver module 212 is contained within a field programmable gate array (FPGA) 214. The gate array 214 is provided with a reference clock 207. The gate array 214 also functions to provide an interface between the transmitter (emitter) module 204 and receiver module 212 and the microprocessor 202. The gate array 214 further functions to produce a local oscillator (LO) signal that is combined with the receiver 212 signals in an analog mixer 216 to generate an intermediate frequency (IF) signal. A low pass filter 218 and high gain amplifier/limiter 220 are used to further condition the IF signal so that the output of the amplifier/limiter 220 provides a detection/no detection data signal that can be processed by the microcontroller 202. A lens test emitter 222 and a lens test receiver 224 may be provided to allow ambient conditions and lens clarity to be monitored and evaluated.

Referring now to FIGS. 3(a)-(c), mechanical diagrams of preferred VCSEL surface mount packages 302, 304 and 306 for use in the emitter module 204 of an object detection system are shown. The A1 surface mount package 302 shown in FIG. 3(a) has a rectangular base 238 and a substantially circular dome 310. The VCSEL element 312 extends above the base 308 and into the dome 310. The electrical contact 314 for VCSEL element 312 is connected to the top of the VCSEL 312 in the dome 310. The A2 surface mount package 304 shown in FIG. 3(b) is similar to the A1 package 302 in that it has a rectangular base 316 and a VCSEL element 318 that extends into a dome 320. However, the dome 320 has a substantially flat upper surface 322 that helps produce a more collimated, coherent laser beam. The A3 surface mount package 306 shown in FIG. 3(c) also has a rectangular base 324 with a flattened dome 326. However, the A3 package 306 uses a VCSEL element 328 that has its electrical connections provided within the rectangular base 324. All of the packages 302, 304 and 306 can be manufactured with integral ceramic heat sinks to improve there heat dissipation characteristics.

In each of the packages 302, 304, 306, the VCSEL element 312, 318, or 328 can be a single VCSEL diode or an array of VCSEL diodes on a single substrate, as shown in FIGS. 4(a)-4(d). In a preferred embodiment of the invention, the surface mount package (302, 304 or 306) for each VCSEL element is a standard LED surface mount package with a ceramic substrate to provide integral heat sinking. One example of such a package is the ULM850-7T-TN-HSM-DCA from ULM Photonics GMBH.

In order to produce high intensity detection beams using an array of VCSEL diodes in a surface mount package without exceeding the heat dissipation capabilities of the package, the present inventors have discovered that it is preferable to use an array of VCSEL diodes spaced apart on a single substrate and to pulse the diodes at a low duty cycle. The low duty cycle reduces the average power dissipated by each VCSEL diode without decreasing the usable intensity of the produced detection beam. Different VCSEL diode arrays 402, 404, 406, 408 and 409 are shown in FIGS. 4(a)-(e). Each VCSEL array 402, 404, 406, 408 and 409 has a chip identifier portion 410 and bonding areas 412 for providing electrical contacts to the chip. The array 402 has five VCSEL diodes 414 arranged like the five dots on a standard die to form a 2×2+1 array measuring approximately 420 µm on each side. The VCSEL apertures 414 have a diameter of approximately 50 µm. Tests performed on array 402 indicate that it could be operated in a constant wave manner with a power level of at least 150 mW, or in a pulsed manner at 500 mW with a duty cycle of less than 1.5% without sustaining any damage. Thus, by pulsing the VCSEL diode array with a low duty cycle, a higher intensity beam can be achieved without damaging the VCSEL.

The array 404 uses six VCSEL diodes 414 arranged peripherally around a seventh central VCSEL diode 414 to form an array approximately 516 µm×516 µm in size. The third array 406 also uses six VCSEL diodes 414 arranged around a seventh central VCSEL diode 414. However, the third array 406 is fabricated on a larger substrate that is approximately 670 µm×670 µm such that the power dissipation capabilities of the array 406 are increased. While the power dissipation capabilities of the third array 406 are increased with respect to the second array 404 due to the increased area of the substrate, those skilled in the art will readily appreciate that the increased size also results in increased cost. The fourth array 408 uses nine VCSEL diodes 414 arranged in a 3×3 array on a substrate of approximately the same size as the second array 404. Arrays 404, 406 and 408 are capable of providing an optical power in a monitored zone of at least 700 mW when operated in a pulsed mode with a duty cycle less than 1.5%. Array 409 consists of three VCSEL diodes in a row on a 670 µm×170 µm substrate that and is capable of producing 300 mW limited duration pulses without sustaining damage. While the VCSEL diode arrays 402, 404, 406, 408 and 409 of FIGS. 4(a)-(e) are illustrated here, a wide variety of different array geometries could be adapted depending upon the requirements of the particular system into which the array will be incorporated.

Figure 5:
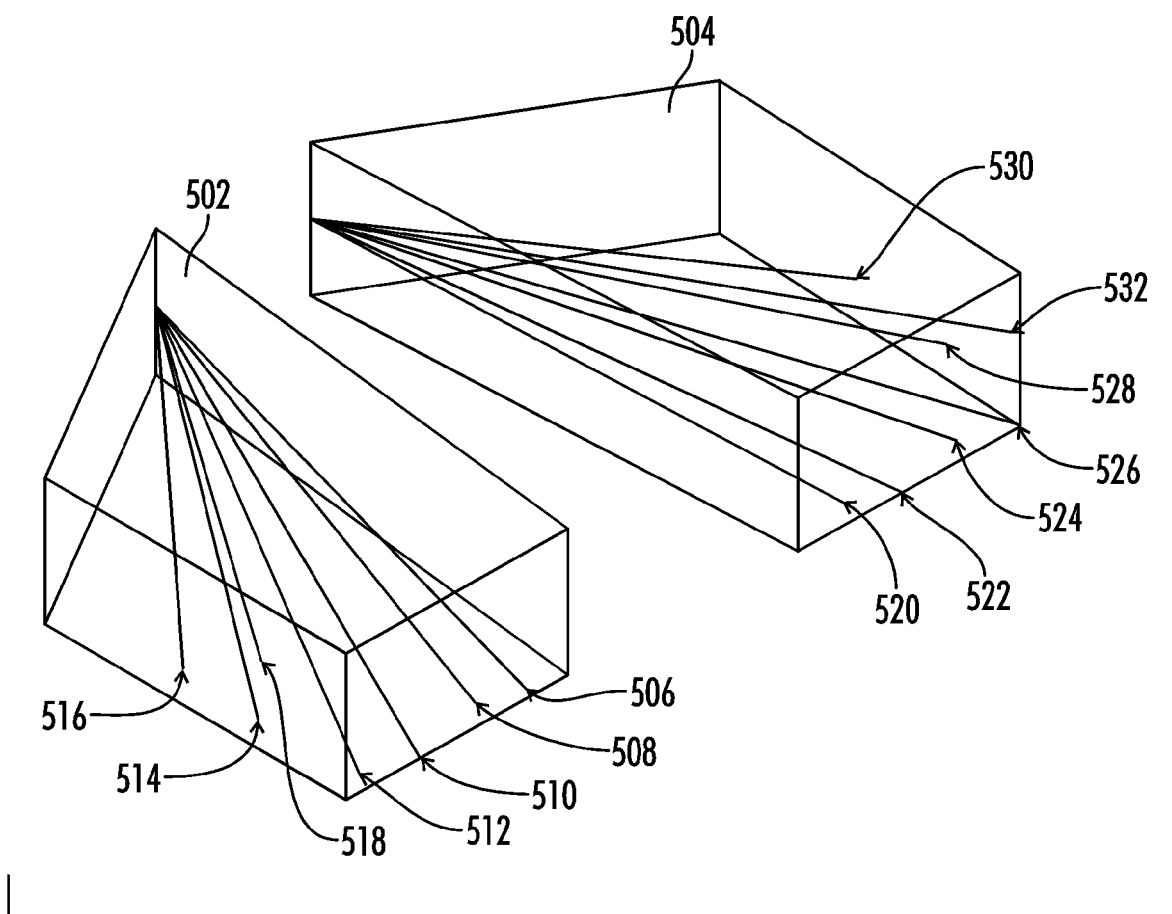
FIG. 5 is perspective view showing multiple detection beams emitted from the transmitter of an SOD system to define a monitored zone in accordance with the present invention.

Referring now to FIG. 5, a diagram of a monitored detection zone definition in accordance with a preferred embodiment of the present invention is shown, utilizing seven emitted detection beams. A detection zone 502 is established for both the left 502 and right sides 504 of the vehicle. Within each zone 502 and 504, seven beams 506-518 and 520-532 are individually aimed to insure proper coverage of the detection zones 502 and 504. Each zone 502 and 504 preferably contains at least one hi-beam 518 and 532 that is aimed vertically above beams 506-516 and 520-530 to insure that objects suspended a certain height above the road surface, such as the bottom of a truck bed supported between a pair of wheels, are detected. The hi-beams 518 and 532 are preferably aimed toward the most distant point of the detection zones 502 and 504 to insure that objects in the center of the detection zones are detected.

Figure 6A:
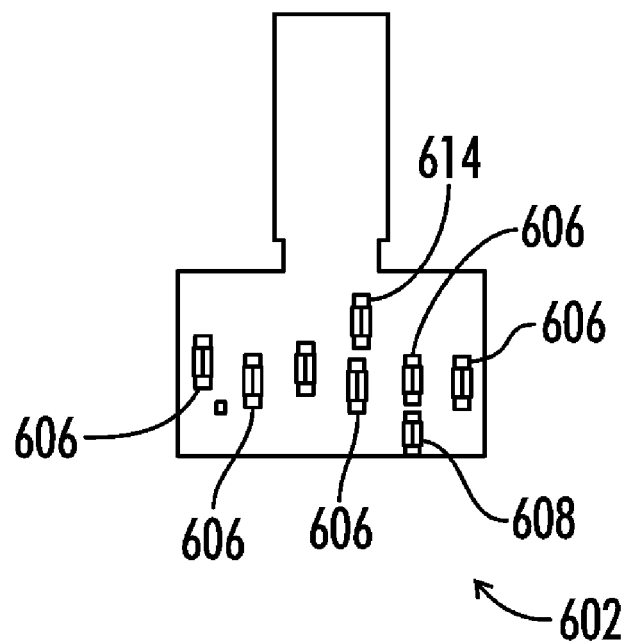
FIG. 6(a) is a plan view of an SOD system emitter module containing an array of VCSEL chips arranged in a reciprocal geometry and functional to generate multiple detection beams as shown in FIG. 5.

Referring now to FIGS. 6(a) and (b), array geometries for one embodiment of an emitter (transmitter) module board 602 and receiver module board 604 for producing and receiving the detection beam patterns of FIG. 5 are shown. The emitting elements 606, which can be either single VCSEL diodes or VCSEL chips having an array of VCSEL diodes (as in the preferred embodiment), are arranged in a staggered up/down relationship to insure proper coverage of the desired detection zone. The hi-beam is provided by offsetting one emitting element 608 from the other elements 606. The geometry of the receiver module board 604, which is identical to the emitter module geometry 602, uses photodetectors 610 arranged in pattern that corresponds to the pattern of the emitting elements 606. An offset photodetector 612 is also provided that corresponds to the hi-beam emitter element 608. In one embodiment, the emitter and receiver boards 602 and 604 can be flex boards that bend to allow the beams to be directed by mounting the boards on a curved mounting surface. In another embodiment, the VCSEL chips can be surface mounted directly on a planar printed circuit board with light pipes or other optics (see FIG. 7) to present the detection beams in the desired orientation. A reference emitter 614 and receiver 616 are provided for calibration purposes.

In a vehicle SOD system operating in accordance with the present invention, the detection beams have a nominal wavelength of 850 nm and provide a minimum optical power in the detection zone of 700 mw. To provide this, the VCSEL chips are driven with current pulses of 1 to 1.2 amps at a 1.2% duty cycle with a nominal pulse duration of 270 ns. In one embodiment of the SOD system, there is a 1.59 inch focal length between the emitter and receiver module board and its corresponding collimating lens. While a duty cycle of less than 1.5% is preferred, the duty cycle could be increased as required for certain applications. A suitable VCSEL diode for such operation is available from ULM Photonics GMBH. The corresponding photodetectors can be SD150-14-002 VCSEL monitor photodiodes also available from ULM Photonics GMBH.

Preferably, the mechanical and electrical arrangement of the optical and electronic components will provide at least 120-150 db of optical and electrical isolation between the transmitter and receiver.

Figure 6B:
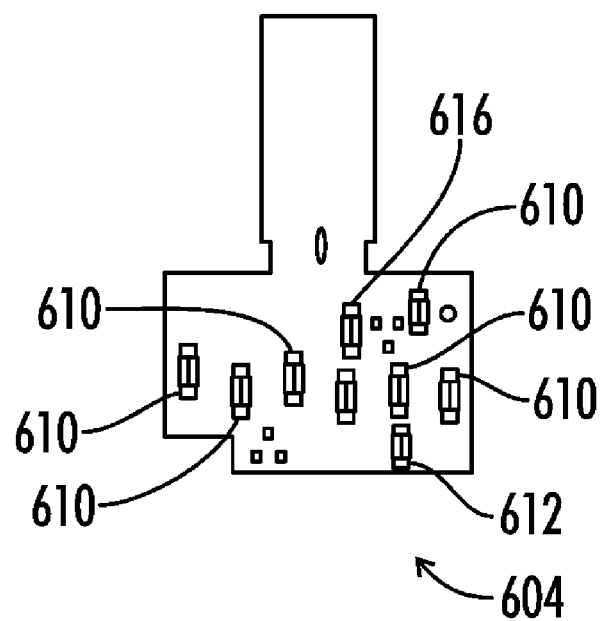
FIG. 6(b) is a plan view of one embodiment of a SOD system receiver containing an array of photo-detectors arranged in a reciprocal geometry and functional to received detection beams reflected from an object in the monitored zone.
Figure 8:
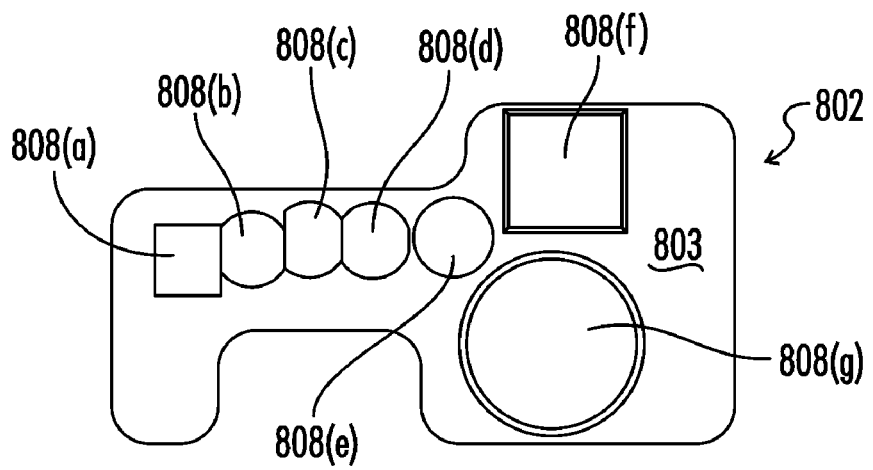
FIG. 8 is a top view of a SOD system emitter optical interface board used in one embodiment of the present invention.
Figure 9:
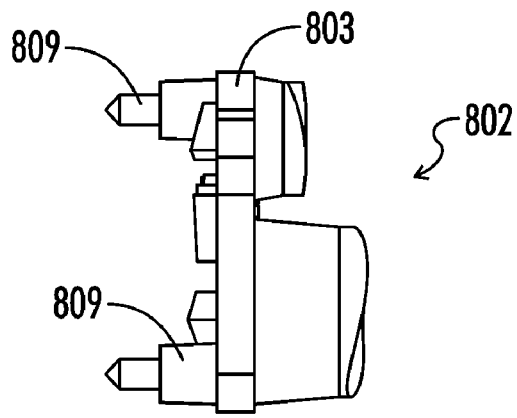
FIG. 9 is a side view of the SOD system emitter optical interface board of FIG. 8.
Figure 10:
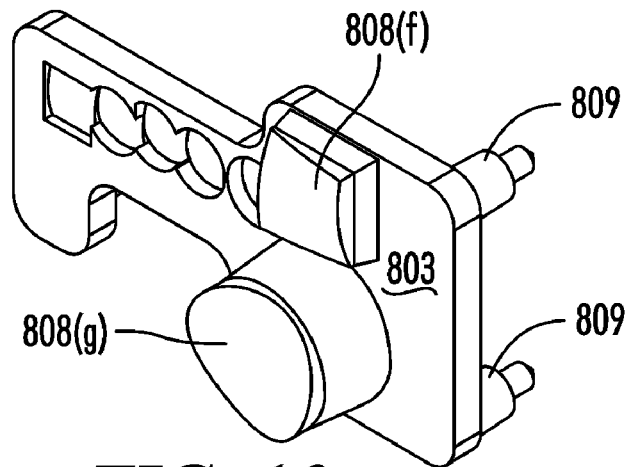
FIG. 10 is an isometric view of the SOD system emitter optical interface board of FIGS. 8-9.
Figure 11:
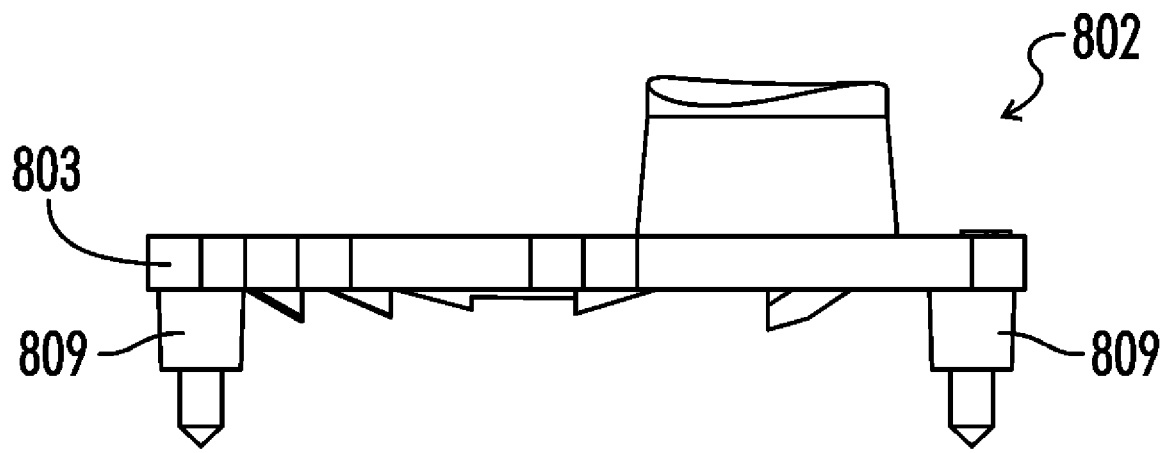
FIG. 11 is an edge view of the SOD system emitter optical interface board of FIGS. 8-10.
Figure 12:
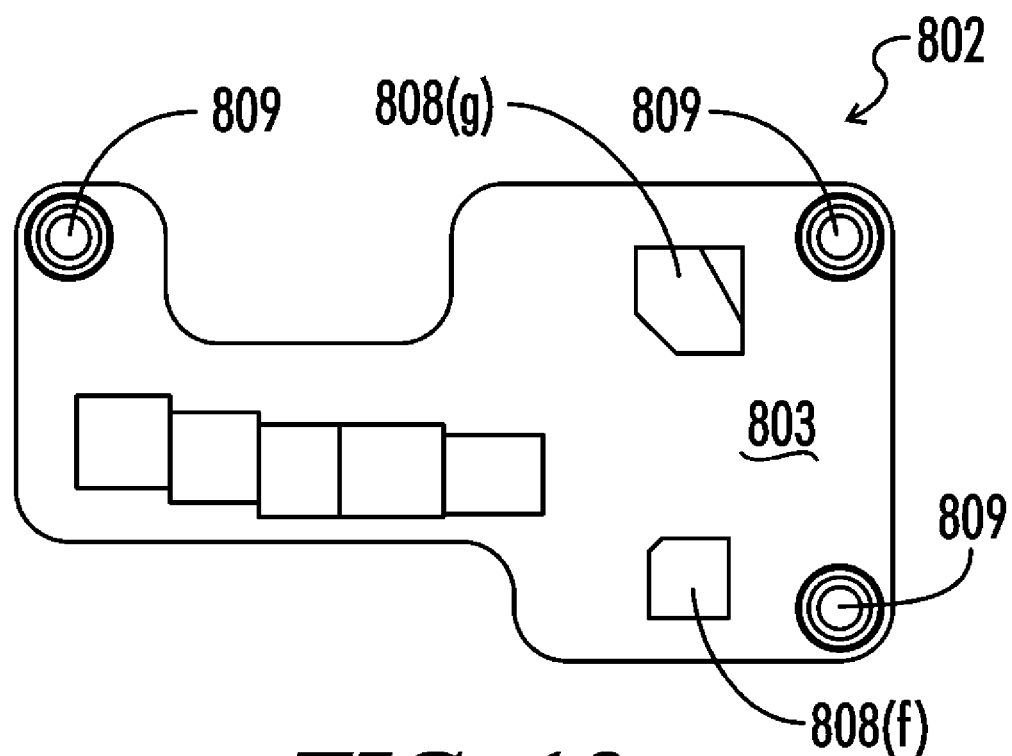
FIG. 12 is a bottom view of the SOD system emitter optical interface board of FIGS. 8-11.
Figure 13:
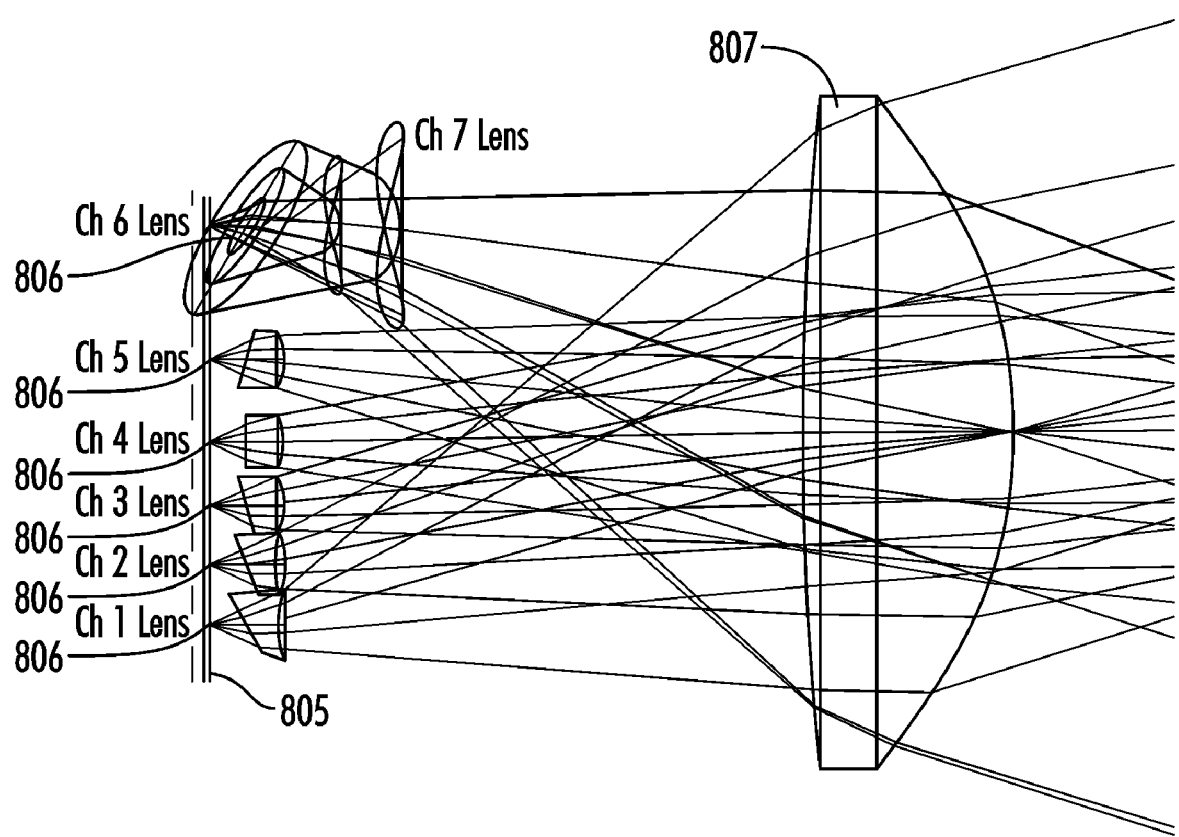
FIG. 13 is a diagram schematically illustrating the optical arrangement and functioning of the VCSEL emitters, light pipes, and collimating lens incorporating the SOD system emitter optical interface board of FIGS. 8-12.
Figure 14:
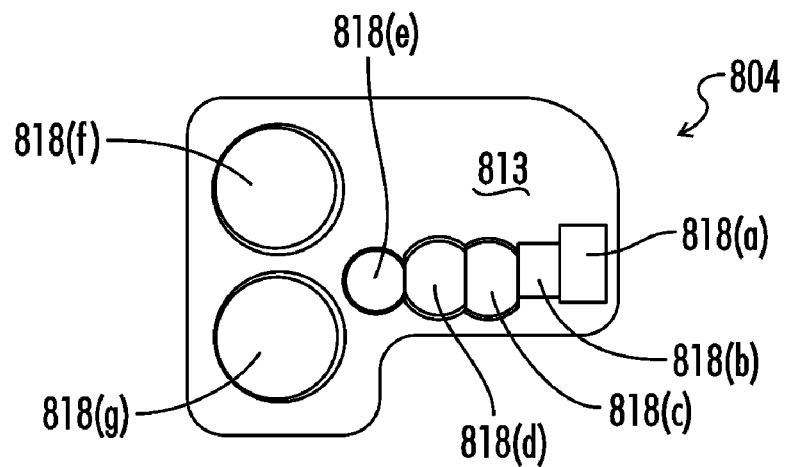
FIG. 14 is a top view of a SOD system receiver optical interface board used in one embodiment of the present invention.
Figure 15:
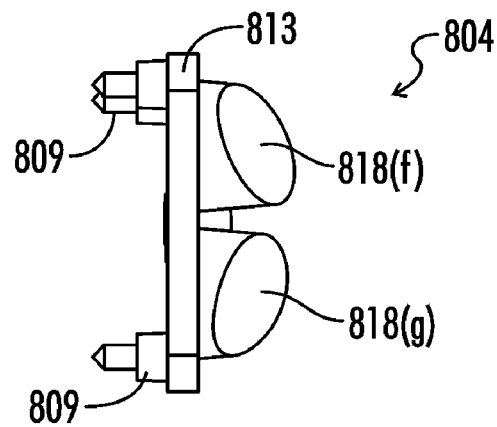
FIG. 15 is a side view of the SOD system receiver optical interface board of FIG. 14.
Figure 16:
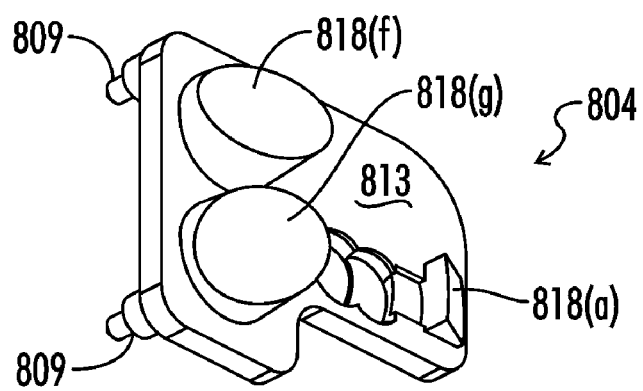
FIG. 16 is an isometric view of the SOD system receiver optical interface board of FIGS. 14-15.
Figure 17:
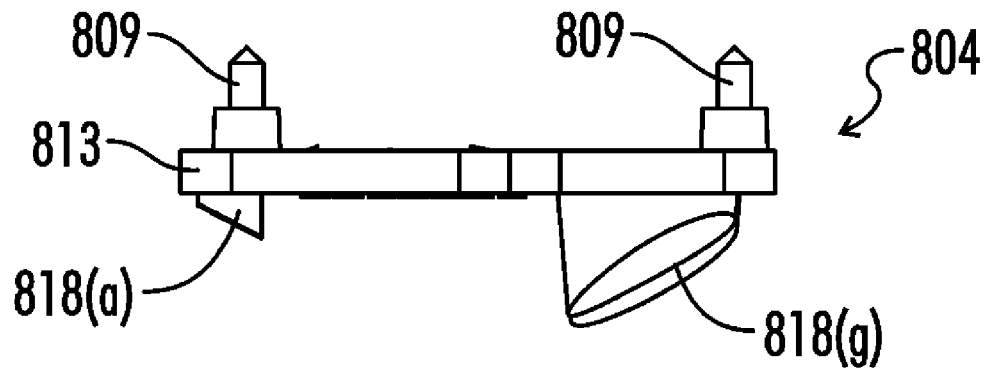
FIG. 17 is an edge view of the SOD system receiver optical interface board of FIGS. 14-16.
Figure 18:
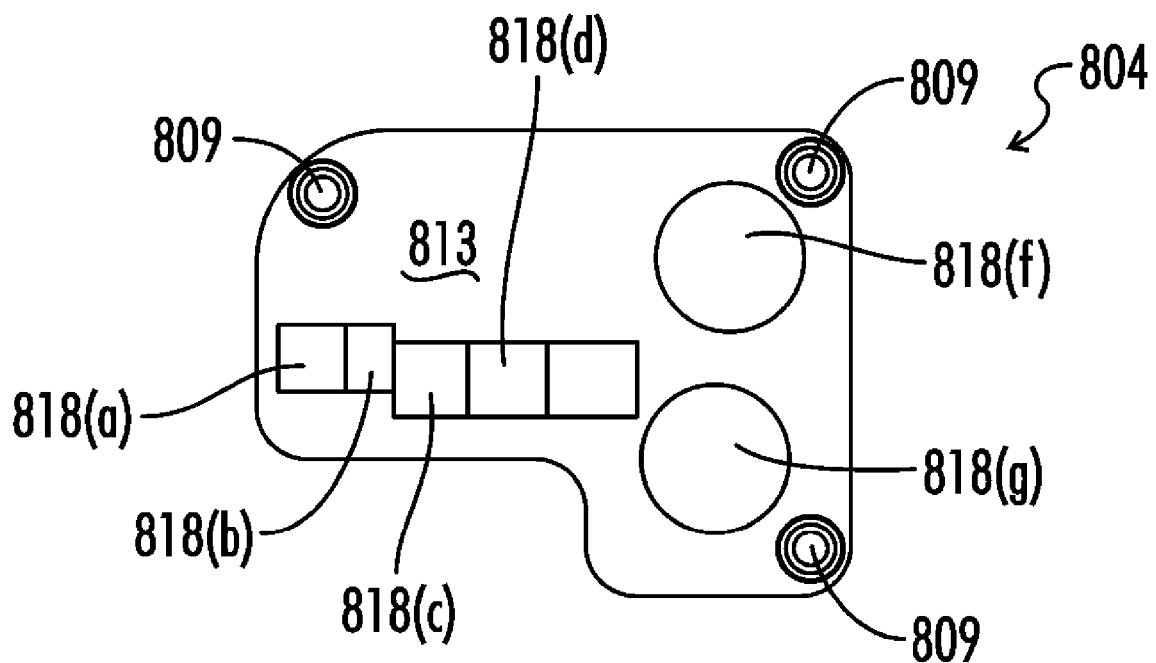
FIG. 18 is a bottom view of the SOD system receiver optical interface board of FIGS. 14-17.
Figure 19:
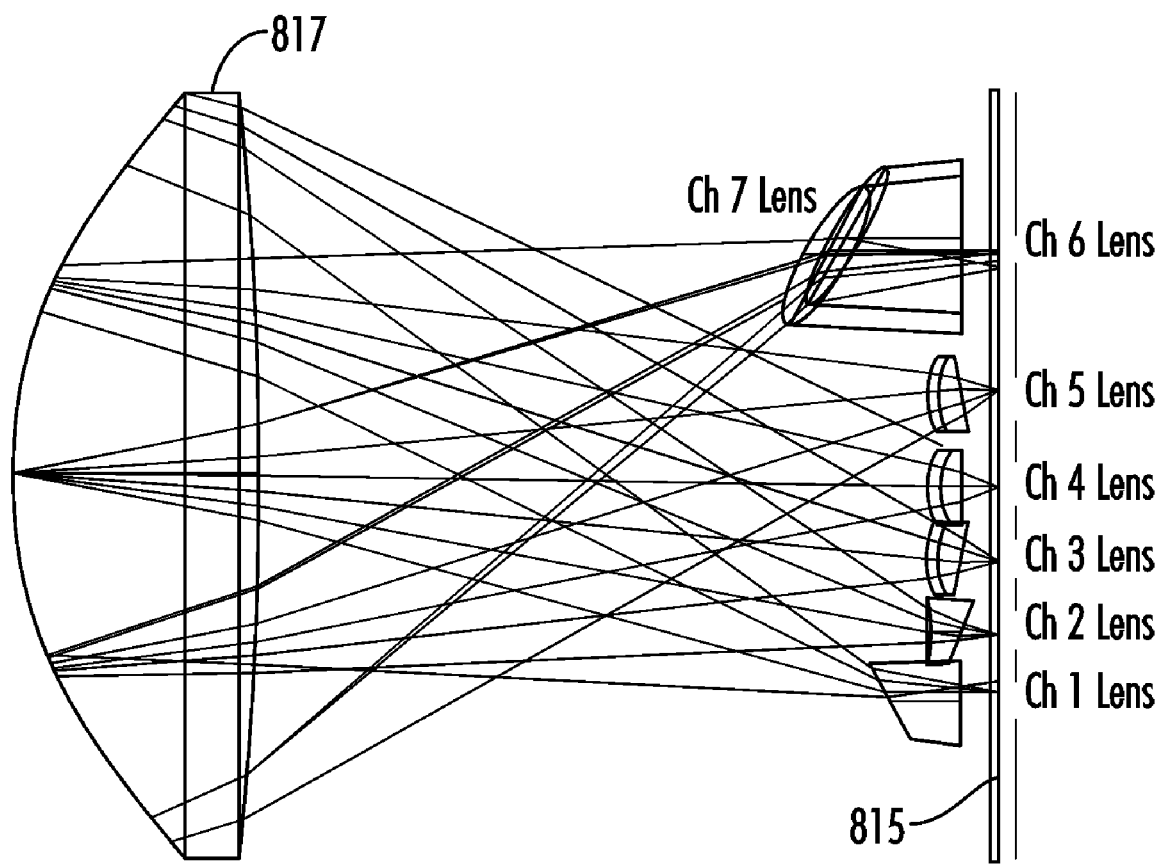
FIG. 19 is a diagram schematically illustrating the optical arrangement and functioning of the photo-receivers, light pipes and collimating lens incorporating the SOD system receiver optical interface board of FIGS. 14-18.

Referring now to FIGS. 7(a)-(e), perspective views of a fiber optic interface 702 for the emitter and receiver boards of FIGS. 6(a) and (b) are shown. The fiber optic interface 702 includes multiple light pipes 704 arranged in a pattern corresponding to the geometry of the emitter and detector arrays shown on FIGS. 6(a) and 6(b). This allows the emitters and detectors to be mounted on a less expensive flat board while retaining their ability to be individually focused on or directed toward a lens center.

Preferably, the VCSEL chip array defined on the transmitter module board 602 has a reciprocal geometry as shown in FIG. 6(a) so that a single board 602 can be used for either right or left side SOD systems simply by rotating the orientation of the board 180 degrees.

Referring now to FIGS. 8-13, an alternative embodiment of an emitter optical interface board 802 used with the SOD system emitter module is shown. Seven emitting elements 806 (FIG. 13), which can be either single VCSEL diodes or VCSEL chips having an array of VCSEL diodes, are arranged on the surface of a planar PCB emitter board 805 (FIG. 13) in a manner to insure proper coverage of the desired detection zone. The emitter board 805 and emitting elements 806 are positioned below corresponding emitter light pipes 808(a)-(g) which are attached to mounting board 803, thereby forming seven optical emitter channels. The light pipes 808(a)-(g) include curved lens elements (seen best on FIGS. 10 and 13) that focus the emitted optical beams onto a collimating lens 807. The lens elements of the light pipes 808(a)-(g) are attached to housing elements as shown. The light pipe housing elements extend away from the mounting board 803 and include geometric facets that bend the emitted optical beams toward the lens elements. Preferably, the light pipe lens elements, housing elements, and mounting board 803 are molded into a single piece of optical plastic, such as acrylic.

FIGS. 14-19 show an alternative embodiment of a receiver optical interface board 804 used with the SOD system receiver module. Seven photo-receiver elements 816 (FIG. 19), are arranged on the surface of a planar PCB receiver board 815 (FIG. 19) in a manner to insure proper coverage of the desired detection zone. The receiver board 815 and photo-receiver elements 816 are positioned below corresponding receiver emitter light pipes 818(a)-(g) which are attached to mounting board 813, thereby forming seven optical receiver channels. The light pipes 818(a)-(g) include curved lens elements (seen best on FIGS. 16 and 19) that focus the received optical beams from collimating lens 817. The lens elements of the light pipes 818(a)-(g) are attached to housing elements as shown. The light pipe housing elements extend away from the mounting board 813 and include geometric facets that bend the received optical beams from the lens elements. Preferably, the light pipe lens elements, housing elements, and mounting board 813 are molded into a single piece of optical plastic, such as acrylic.

Figure 20:
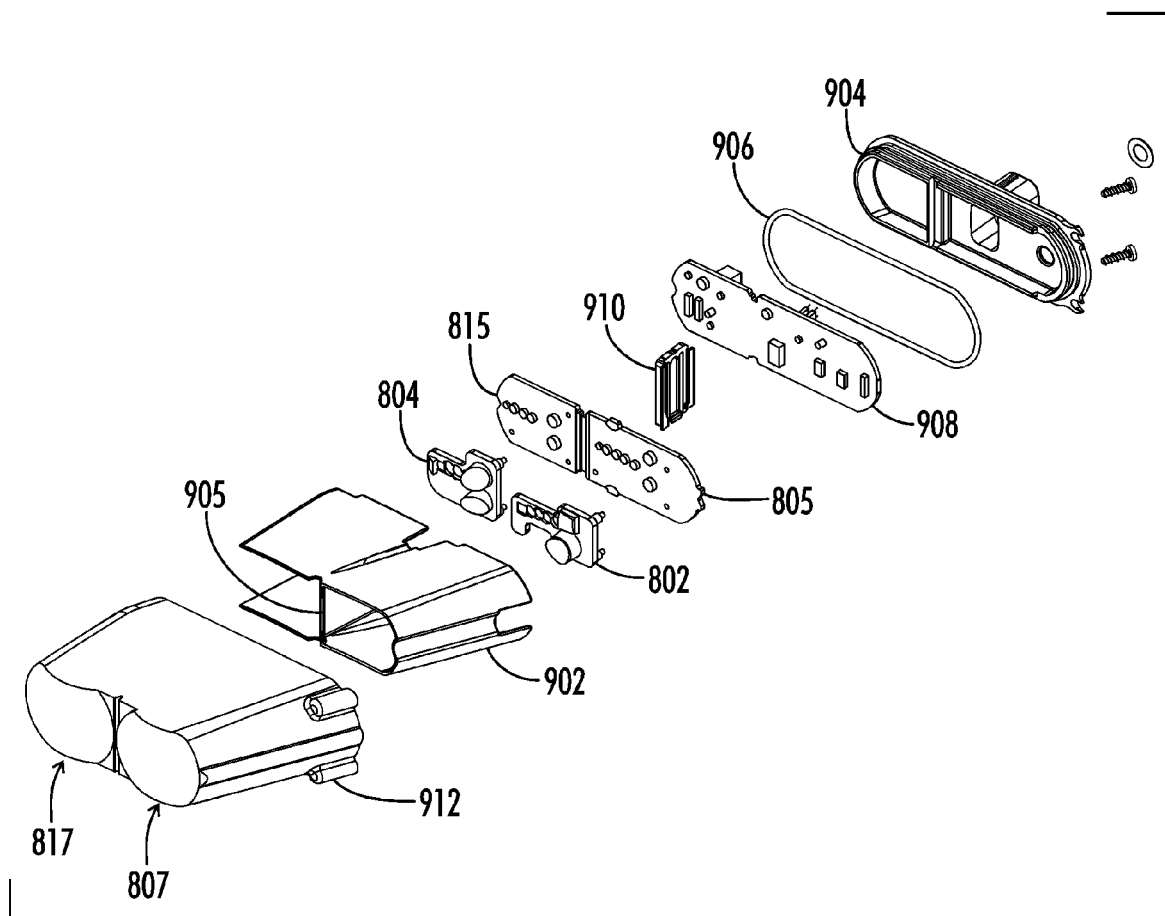
FIG. 20 is an exploded isometric view of a preferred embodiment of a SOD system emitter/receiver assembly incorporating the SOD system emitter and receiver optical interface boards shown in FIGS. 8-19.

FIG. 20 illustrates, in an exploded view, how the SOD system emitter and receiver modules can be mounted into a compact SOD system assembly 900. The emitter board 805 and receiver board 815 are part of a single PCB board. The emitter optical interface board 802 and receiver optical interface board 804 are mounted to the emitter board 805 and receiver board 815 respectively using stand-off spacers 809. An optical/Faraday shield 902 is then placed over the emitter optical interface board 802 and receiver optical interface board 804 and includes a center vertical member 905 to provide optical and Faraday isolation between the emitter and receiver modules. A system electronics board 908 contains the device driver, controller, and related electronics components (as described above) are mounted on board 908. Spacer panel 910 separates board 908 from boards 805/815 and preferably provides interconnections and is plated to provide additional optical and Faraday isolation.

A housing cover 912 then covers the assembly 900. Preferably, the collimating lenses 807 and 817 are part of the housing 912 and are spaced at a predetermined focal length away from the emitter and receiver optical interface boards 802 and 804. The housing cover 912 is attached to housing base component 904 using screws or other fasteners with O-ring 906 sealing the joint.

Preferably, optical/Faraday shield 902, spacer panel 910, and base component 904 are made of shielded plastic to provide both optical and Faraday shielding.

Thus, although there have been described particular embodiments of the present invention of a new and useful "Object Detection System with a VCSEL Diode Array," it is not intended that such references be construed as limitations upon the scope of this invention except as set forth in the following claims.

What is claimed is:

1. An object detection system for detecting the presence of an object in a monitored zone, comprising:
   a) an optical transmitter for generating a plurality of emitter beams intermittently into the monitored zone;
   b) an optical receiver for receiving the emitter beams reflected from an object in the monitored zone; and
   c) a system board electrically coupled to the optical transmitter and receiver, the system board including logic functional to cause the transmitter to generate optical emitter beams, to cause the receiver to receive the optical emitter beams reflected from the object and to process the received optical emitter beams;
   d) wherein the optical transmitter comprises an emitter module having a plurality of vertical cavity surface emitting laser (VCSEL) chips, each VCSEL chip comprising a plurality of spaced VCSEL diodes operable to produce the emitter beams, the optical transmitter further comprising a transmitter circuit board mounting each VCSEL chip, the plurality of VCSEL diodes on each VCSEL chip being mounted on a substrate in a surface mount package having an integral dissipating element in a pre-defined two dimensional array, wherein the system board operates the emitter module to electrically pulse the VCSEL diodes at a duty cycle of less than approximately 1.5% for limiting the temperature of the diodes to produce high intensity emitter beams without damaging the VCSEL diodes.

2. The system of claim 1 wherein a cluster of VCSEL diodes in each VCSEL chip is positioned on a substrate in a pre-defined two dimensional VCSEL diode array.

3. The system of claim 2 wherein each VCSEL diode substrate comprises a ceramic material.

4. The system of claim 2 wherein each VCSEL chip has a circular aperture.

5. The system of claim 2 wherein said two dimensional VCSEL diode array comprises six vertical cavity surface emitting lasers arranged around a center vertical cavity surface emitting laser.

6. The system of claim 1 further comprising a transmitter lens and wherein the optical transmitter comprises at least one light pipe positioned over the emitter module, the light pipe extending away from the transmitter circuit board to direct optical signals through the transmitter lens.

7. An object detection system comprising:
   a) an optical transmitter;
   b) an optical receiver;
   c) a system board electrically coupled to the optical transmitter and receiver, the system board including logic functional to cause the transmitter to generate optical signals, to cause the receiver to receive the optical signals when reflected from a detected object, and to process the received optical signals;
   d) the optical transmitter comprising an emitter board, the emitter board comprising a plurality of vertical cavity surface emitting laser (VCSEL) emitters arranged on the surface of the emitter board;
   e) the optical transmitter further comprising an emitter optical interface board positioned above the emitter board, the emitter optical interface board comprising a plurality of emitter light pipes mounted to an emitter light pipe mounting board, each one of the emitter light pipes being positioned over a corresponding one of the VCSEL emitters;
   f) each of the emitter light pipes comprising a lens portion and a housing portion extending vertically upward from the emitter light pipe mounting board;
   g) the optical receiver comprising a receiver board, the receiver board comprising a plurality of photo-detectors arranged on the surface of the receiver board;
   h) the optical receiver further comprising a receiver optical interface board positioned above the receiver board, the receiver optical interface board comprising a plurality of receiver light pipes mounted to a receiver light pipe mounting board, each one of the receiver light pipes being positioned over a corresponding one of the photo-detectors; and
   i) each of the receiver light pipes comprising a lens portion and a housing portion extending vertically upward from the receiver light pipe mounting board.

8. The object detection system of claim 7 further comprising an emitter collimating lens positioned above the emitter light pipes and a receiver collimating lens positioned about the receiver light pipes.

9. The object detection system of claim 8 further comprising shielding providing optical and Faraday isolation between the emitter light pipes and the receiver light pipes.

10. An object detection system for detecting the presence of an object in a monitored zone adjacent a vehicle when activated, comprising:
    a) an optical transmitter for generating a plurality of emitter beams intermittently into the monitored zone;
    b) an optical receiver for receiving the emitter beams reflected from an object in the monitored zone; and
    c) a system board electrically coupled to the optical transmitter and receiver to control their operation, the system board including logic functional to cause the transmitter to generate the optical emitter beams, to cause the receiver to receive the optical emitter beams reflected from the object to produce object detect signals;
    d) wherein the optical transmitter comprises an emitter module having a plurality of vertical cavity surface emitting laser (VCSEL) chips, each VCSEL chip comprising a plurality of spaced VCSEL diodes operable to produce the emitter beams, the optical transmitter further comprising a transmitter circuit board mounting each VCSEL chip, the plurality of VCSEL diodes on each VCSEL chip being mounted on a substrate in a surface mount package, the surface mount package having an integral heat dissipating element, the plurality of VCSEL chips being positioned on the transmitter circuit board in a pre-defined tow dimensional VCSEL chip array, the plurality of VCSEL diodes in each of the VCSEL chips being positioned on the substrate in a pre-defined two dimensional VCSEL diode array, wherein the system board operates the emitter module to pulse the VCSEL diodes at a low duty cycle to limit the temperature of the diodes to produce high intensity emitter beams without damaging the VCSEL diodes, said VCSEL diodes being electrically pulsed at a duty cycle of less than approximately 1.5%.

11. An object detection system for detecting the presence of an object in a monitored zone adjacent a vehicle when activated, comprising:
    a) an optical transmitter for generating a plurality of spaced emitter beams intermittently into the monitored zone;
    b) an optical receiver for receiving the emitter beams reflected from an object in the monitored zone; and
    c) a system board electrically coupled to the optical transmitter and receiver to control the operating the system board including logic functional to cause the transmitter to generate the optical emitter beams, to cause the receiver to receive the optical emitter beams reflected from the object to produce object detect signals;
    d) wherein the optical transmitter comprises an emitter module having a plurality of vertical cavity surface emitting laser (VCSEL) chips, each VCSEL chip comprising a plurality of spaced VCSEL diodes operable to emitter beams, the optical transmitter further comprising a transmitter circuit board mounting each VCSEL chip, the plurality of VCSEL diodes on each VCSEL chip being mounted on a substrate in a surface mount package, the surface mount package having an integral heat dissipating element, the plurality of VCSEL chips being positioned on the transmitter circuit board in a pre-defined tow dimensional VCSEL chip array, the plurality of VCSEL diodes in each of the VCSEL chips being positioned on the substrate in a pre-defined two dimensional VCSEL diode array, the VCSEL chip array comprising a reciprocal geometry to allow the transmitter board to be used in either a right or left side system location by rotating the transmitter board 180 degrees, wherein the system board operates the emitter module to pulse the VCSEL diodes at a low duty cycle to limit the temperature of the diodes to produce high intensity emitter beams without damaging the VCSEL diodes.

* * * * *